United States Patent [19]

Rembutsu

[11] Patent Number: 5,327,058
[45] Date of Patent: Jul. 5, 1994

[54] METHOD OF CONTROL FOR AN INDUSTRIAL ROBOT

[75] Inventor: Tatsuya Rembutsu, Kawasaki, Japan

[73] Assignee: Tokico Ltd., Japan

[21] Appl. No.: 15,681

[22] Filed: Feb. 9, 1993

Related U.S. Application Data

[63] Continuation of Ser. No. 642,357, Jan. 17, 1991, abandoned.

[30] Foreign Application Priority Data

Jan. 19, 1990 [JP] Japan .................................. 2-9543

[51] Int. Cl.⁵ .................................... G05B 19/19
[52] U.S. Cl. ......................... 318/568.11; 318/568.13; 318/603
[58] Field of Search ...................... 318/568.11, 568.13, 318/568.14, 568.16, 568.17, 568.23, 569, 567, 600–603; 395/80, 85, 88

[56] References Cited

U.S. PATENT DOCUMENTS

| | | | |
|---|---|---|---|
| 4,178,632 | 12/1979 | Anthony | 318/568.14 X |
| 4,484,120 | 11/1984 | Olex et al. | 318/568.16 X |
| 4,870,336 | 9/1989 | Nickerson | 318/568.14 X |

Primary Examiner—William M. Shoop, Jr.
Assistant Examiner—David Martin
Attorney, Agent, or Firm—Scully, Scott, Murphy & Presser

[57] ABSTRACT

A control method for use in industrial robots, and particularly an advantageous control method for use in industrial robots having attached thereto and using work tools (for example, a spray gun having a state in which paint is sprayed and a state in which paint is not sprayed) having a plurality of operational states is disclosed. That is, it is a control method for use in industrial robots which teaches the first data, which determine the path of the robot, and the second data, which determine the position of the switching of the operational state of the work tool attached to the robot in the path, and controls the operation of the work tool by means of the switching of the operational state of the work tool based on the second data during the operation, based on the first data, of the robot.

11 Claims, 3 Drawing Sheets

1 --- WORK TOOL
2 --- ROBOT BODY

1 --- WORK TOOL
2 --- ROBOT BODY

FIG. 4(a)
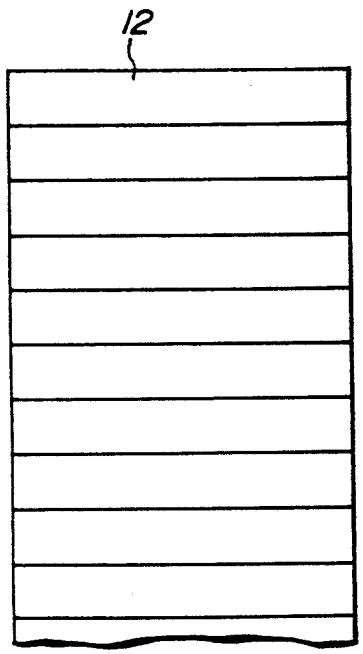
FIG. 4(b)
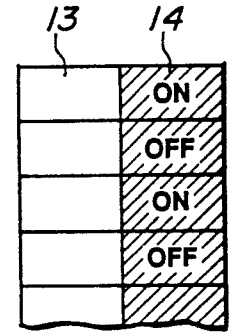
FIG. 5
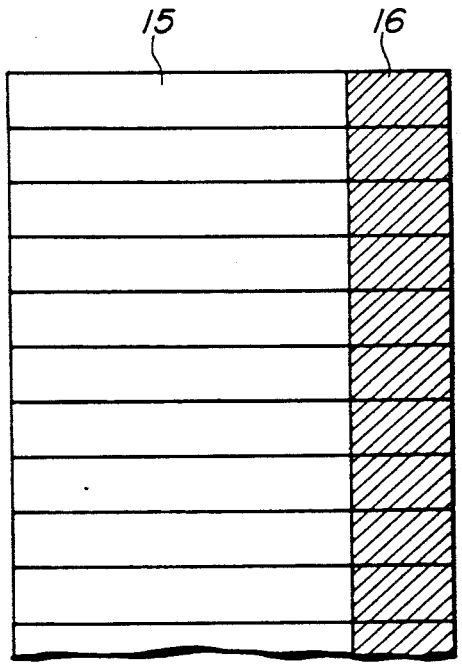
FIG. 6
| 5 | 6 | 7 |
|---|---|---|
| POSITION DATA P1 | | |
| POSITION DATA S1 | ON | |
| POSITION DATA S2 | OFF | |
| POSITION DATA P2 | | |
| POSITION DATA P3 | | |
| POSITION DATA S3 | ON | |
| POSITION DATA S4 | OFF | |
| POSITION DATA P4 | | |

METHOD OF CONTROL FOR AN INDUSTRIAL ROBOT

This is a continuation of copending application Ser. No. 642,357 filed on Jan. 17, 1991 now abandoned.

FIELD OF THE INVENTION

The present invention relates to a method of control for an industrial robot, especially an advantageous control method used in industrial robots having attached thereto and using work tools having a plurality of work states (for example, a spray gun having a state in which it sprays paint and a state in which it does not spray paint).

BACKGROUND ART

Previously, industrial robots having teaching and playback which could be flexibly set in response to the desired type of work by changing the operational programs thereof were used as automatic machines which performed work such as painting or welding in place of human beings.

This type of industrial robot comprises a robot body which moves and operates work tools attached thereto and a control apparatus which controls the movement of the robot body and the work tools. In addition, the automatic control exercised by this control apparatus is carried out based on an operational program stored in tile control apparatus, which is created by the teaching operation.

Furthermore, the data for the switching of the operation state of the work tool (for example, if the work tool is a paint gun, the data on whether or not paint is sprayed) are established, in the case of a PTP (point-to-point) teaching method, for each teaching point as the data in the operation program at the time of the instructed operation.

For example, as shown in FIG. 1, the form of the data of a conventional operation program at the time when a spray gun 1 attached to a robot body 2 carries out the painting operation shown by path 4 with respect to work 3 is in the form shown in FIG. 6. That is to say, position data 5, which show the posture of the robot body at each point of teaching, transfer data 7, which show the transfer state to the next teaching point (the transfer speed, etc.), and movement data 6 of the work tool (for example, a spray gun) are established for each teaching point, and memory area is secured for the movement data 6 of the work tools at each teaching point as well.

Furthermore, in this case the teaching operation is carried out by the successive storing of the characteristic points of the operational path by the operator. That is to say, the robot body 2 is operated manually, and point P1 is first instructed. Next, point S1, at which painting begins (spray gun is turned on), point S2, at which painting stops (spray gun is turned off), points P2 and P3, at which the path changes, points S3 and S4, at which the painting is turned on and off, point P4, at which the path changes, etc., which indicate the posture of the robot and the state of operation of the spray gun (that is, operation data 6), are instructed, and the operation program thus created.

In addition, in the same way, in the case of CP (continuous path) teaching, there is no establishment of data concerning the transfer between teaching points as shown in FIG. 5; however, robot body positional data 15 and work tool operation data 16 are stored at regular time intervals for each teaching point.

When the operational program data created in the above manner are viewed from the standpoint of the movement of the robot body, it is sufficient for the positional data 5 and the transfer data 7 if teaching points P1, P2, P3, and P4 are included, while points S1, S2, S3, and S4 are unnecessary. Furthermore, when they are viewed from the standpoint of the operation of the work tool, it is sufficient for operation data 6 if teaching points S1, S2, S3, and S4 are included, while teaching points P1, P2, P3, and P4 are unnecessary. In this way, there are many superfluous parts in the stored teaching program in the conventional method of control, and the memory efficiency is poor. In addition, as the posture of the robot body and the operation state of the work tool must be instructed for each teaching point, there are times in the teaching operation when there are many complications.

SUMMARY OF THE INVENTION

The method of control of industrial robots of the present invention is a control method for industrial robots which transfers a work tool and switches the operation state of the work tool; it is characterized in that it teaches the first data, which determine the path of the robot, and the second data, which determine the position of the switching of the state of operation of the work tool in the path, and controls the operation of the work tool by means of the switching of the operational state of the work tool based on the second data during the operation, based on the first data, of the robot.

Furthermore, at every sampling cycle, which is for the purpose of controlling the path of the robot body, the second data are read out and a decision is made as to whether the operational state of the work tool should be switched or not, and the switching of the operational state of the work tool is carried out.

As a result, according to the control method for industrial robots of the present invention, the number of data to be established as the data for the switching of the operational state of the work tool are limited to a number corresponding to the number of times the operational state of the work tool is switched, so that this represents an improvement. Furthermore, the number of robot body position data are limited to a number corresponding to the number of times the path changes, so that this represents an improvement; in comparison with previous control methods in which teaching points, comprising both points at which the operational state of the work tool changed and points at which the path changed, were individually established, the memory area required for these data can be remarkably reduced.

In addition, as the number of data established is remarkably reduced, the data establishment operation for the purpose of the operation of the robot (that is, the teaching operation) becomes easy.

Furthermore, it is easy to modify only the position of switching of the operational state of the work tool by changing the second data. Accordingly, if one program for one work was created, it is easy to treat other programs for other works which have same positional data to determine a path of the robot as said one program.

Furthermore, the data for the control of the work tool are confirmed and the operational state of the work tool is switched at each sampling cycle for the purpose of the control of the robot body, so that it is possible to determine and finely control the operation of the work tool in the same way as the operation of the robot body.

Accordingly, according to the control method for industrial robots of the present invention, the number of data to be established in the teaching operation is remarkably smaller than in conventional methods, so that the following effects are achieved.

1) The teaching operation becomes easy.
2) The teaching time is shortened.
3) The accuracy of the teaching is increased.
4) The program modification operation becomes easy.
5) The program modification time is shortened.
6) The accuracy of the program modification is increased.
7) The accuracy of robot operation is increased.
8) A small number of points are instructed.
9) The efficiency of memory use is good.
10) Many teaching programs can be stored in the main memory.
11) Cases necessitating secondary memory apparatuses are reduced.

Furthermore, the operation of the work tool can be determined and finely controlled in the same way as the operation of the robot body, so that the quality of the work is improved.

BRIEF DESCRIPTION OF THE DRAWINGS

FIGS. 1 to 3 are diagrams showing a preferred embodiment of the present invention;

FIG. 1 shows a painting robot in an operational state,

FIGS. 2(a) and 2(b) are memory concept diagrams explaining the first and second data respectively, and FIG. 3 is a control PAD diagram of the time of the robot regeneration operation.

Furthermore, FIGS. 4(a) and 4(b) are diagrams for the explanation of another preferred embodiment of the present invention; they are memory concept diagrams for the explanation of the first and second data.

In addition, FIGS. 5 and 6 are diagrams for the explanation of the background art;

FIG. 5 is a memory concept diagram of the CP teaching program, while

FIG. 6 is a memory concept diagram of the PTP teaching program.

DETAILED DESCRIPTION OF THE PREFERRED EMBODIMENTS

Hereinafter, a preferred embodiment of the present invention will be explained with reference to FIGS. 1 to 3.

It is possible to use, as a industrial robot which realizes the present invention, a teaching regeneration type robot with a normal PTP teaching regeneration method which is provided with a six axis, multi-jointed robot body, a control apparatus 25 including timing means 27 which controls this robot body, and a teaching box which allows an operator to send various types of directives to the control apparatus from a different place. That is, it is possible to use an industrial robot with a method in which the operator operates the teaching box while watching the robot body, and while moving the robot body by manual operation, establishes various types of data in the control apparatus at fixed positions (fixed postures of the robot body), thereby creating a desired operational program within the memory of the control apparatus.

In order to easily realize the present invention, it is preferable that a function (hereinafter called the teaching mode time regeneration function) which permits the tracing of a path based on the positional data taught in the teaching mode (the state in which the teaching operation is possible) and the operation of robot body 2 at an appropriate speed in a forward or backward direction be provided in the control apparatus 25. In the case of the present preferred embodiment, explanation will be given of the case in which this teaching mode time regeneration function is provided.

Figure 1:
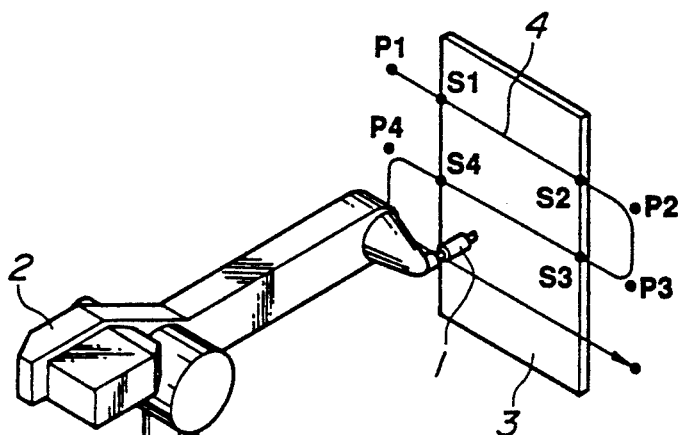
Figure 1:
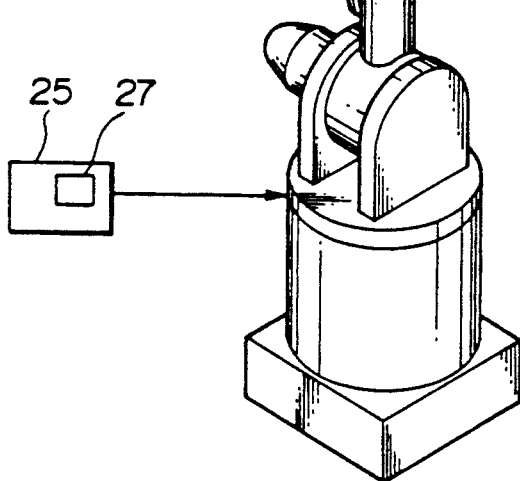

First, a teaching method for an operational program for the carrying out of the painting operation shown by path 4 with respect to a work 3 by a robot body 2 to which a spray gun 1 (work tool) such as that shown in FIG. 1 is attached will be explained as an example of a teaching method for an operational program in the control method of the present invention. Here, path 4 shows the transfer rout of the target positions of spray gun 1.

At the beginning, the robot is started in the teaching mode, attention is given solely to the movement of robot body 2 (the movement which moves spray gun 1 along path 4), robot body 2 is operated manually and the positional or transfer data corresponding to point P1 is taught, and then the points P2, P3, P4, . . . at which the path similarly changes are successively taught.

Next, in the teaching mode, robot body 2 is moved along path 4 using the teaching mode time regeneration function, and operational data are taught at the positions S1, S2, S3, and S4, at which the operational state of the work tool is switched.

That is, first, robot body 2 is moved manually and moved to point P1. Next the forward movement key (a switch for the purpose of moving the robot body 2 in a forward direction by engaging the teaching mode time regeneration function) is depressed, and the robot body 2 moves from point P1 to point P2. Then, while the robot is in motion, when the robot body 2 reaches the position S1 at which painting begins, the spray-on key is depressed and work tool operation data established.

Here, the spray-on key is a switch for the purpose of establishing data (operational data 11 mentioned below) which switch the operational state and the state of the spraying of the paint; when the spray-on key is depressed, time data 10 mentioned below are also automatically established in correspondence with the previous data. It is preferable that the forward movement key and the spray-on key be provided on the teaching box.

Furthermore, here, in the case in which the position of the beginning of painting is to be precisely taught, for example, the forward movement key is depressed and the robot moved from point P1 to point P2, and when the position of the beginning of painting S1 is reached, the forward motion key is released and the spray-on key is depressed while the robot is stopped at the point S1. That is, by the operation of the forward movement key, the robot body 2 is moved forward while tracing the path 4, and in the same way the backward movement key (a switch having the opposite function to that of the forward movement key; it is of course also preferable that it be provided on the teaching box) is depressed, the robot body 2 moves in a backward direction (in other words, for example, the direction from point P2 to point P1), the robot is moved precisely to the position of the beginning of painting, and then the spray-on key is depressed and the operational data for the beginning of painting are taught. Then, furthermore, the points S2, S3, and S4, which are points of the beginning or ending of painting, are successively taught in the same way, and the teaching of the operational program for the painting operation shown in FIG. 1 is finished.

Figure 2A:
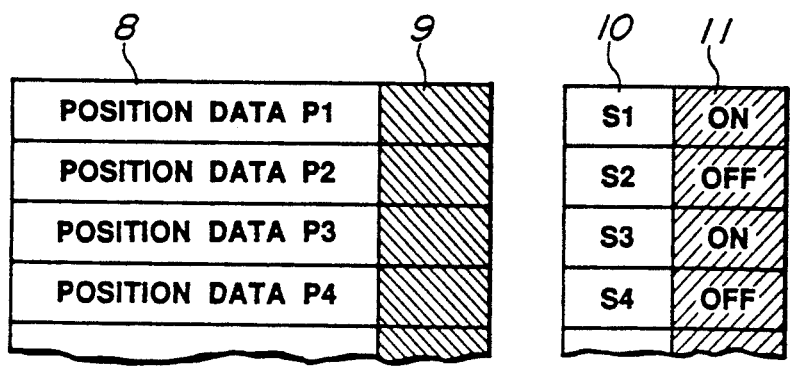

In addition, the operational data of this robot body 2 and the operational data of spray gun 1 are stored, for example, in the control apparatus 25 in the data format shown in FIG. 2(a) and FIG. 2(b).

That is, the operational data of robot body 2 (first data) are, as shown in FIG. 2(a), placed in a data format in which transfer data 9 are made to correspond to position data 8 of the robot body 2 at each taught point P1, P2, P3, P4, . . . .

Furthermore, the operational data of spray gun 1 (second data) are, as shown in FIG. 2(b), placed in a data format in which the operational data 11 of spray gun 1 are made to correspond to time data 10 which are expressed by the times (concretely, the number of the sampling period, for example) at which the robot body 2 reaches each instruction point S2, S3, S4, . . . after starting from point P1.

Next, the method of the regeneration operation of robot body 2 by means of the taught data shown in FIG. 2(a) and FIG. 2(b) created in the above manner will be explained.

First, it is acceptable to control the operation of robot body 2 by means of all positional data 8 and transfer data 9. Here, it is acceptable to adopt a method which achieves continuous operation by interpolating between the taught points, as for example in the case of the conventional PTP method, as the control method. For example, to explain the operation from taught point P1 to P2, the control of the robot body 2 is carried out at previously established time intervals (sampling periods), the posture of robot body 2 in every time interval in which control is to be exercised is calculated from the posture at points P1 and P2 (in other words, an interpolation calculation is carried out), control signals are determined in correspondence with the calculated posture data, these are successively outputted in the time intervals from the control apparatus 25 to robot body 2, and by means of this, operation is carried out between points P1 and P2. In this way, robot body 2 moves smoothly along the taught path 4.

In addition, the control of spray gun 1 (spray on/off) checks, when the robot body is performing regeneration operations, the operational data of the spray gun shown in FIG. 2(b) at each sampling period; when time data 10 are in agreement with the present moment, a control signal corresponding to operational data 11 is outputted from the control apparatus to spray gun 1 or the mechanisms near spray gun 1, and the operational state of spray gun 1 thus switched.

Figure 3:
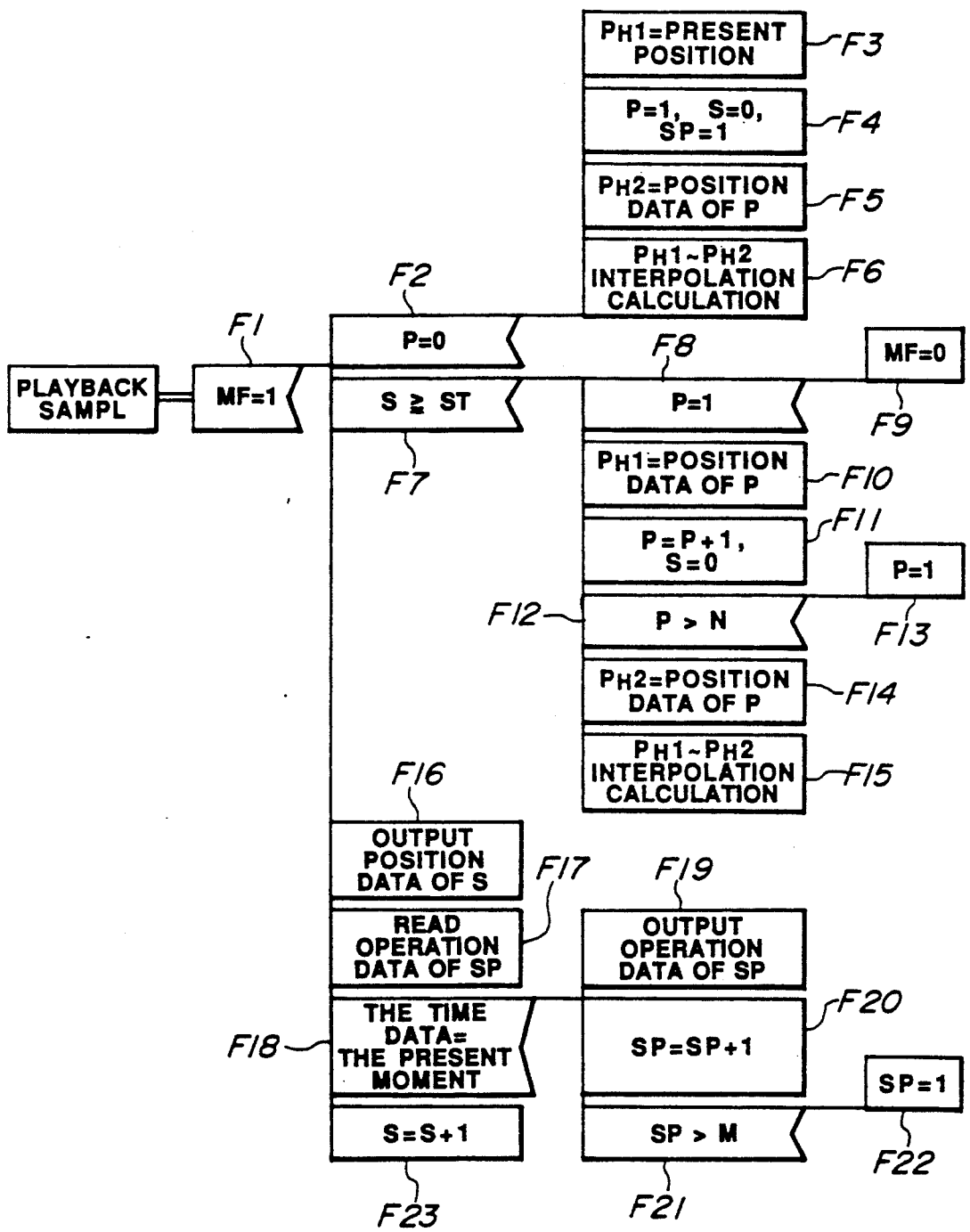

That is, concretely, when the robot is started in the regeneration mode (the state in which regeneration operations are conducted), it is acceptable to first set the point number indicating the number of the taught points P1, P2, . . . to "0", and set the movement flag MF to "1", and after this to process the program shown in the PAD diagram of FIG. 3 at each sampling period and thus realize regeneration operations. Hereinafter, this program will be explained step by step.

(Step F1)
If movement flag MF is "1", step F2 is proceeded to; if MF is "0", no action is taken and processing is ended.
(Step F2)

In the case where point number P is "0", step F3 is proceeded to; if point number P is greater than 0, step F7 is proceeded to.
(Step F3)
The present position data of robot body 2 is established in point data PH1, which shows the beginning point of the interpolation calculation, and step F4 is proceeded to.
(Step F4)
Point number SP, which shows the number of the operation taught points S1, S2, . . . and point number P are set to "1", indicating the first point, interpolation point number S is set to "0", and step F5 is proceeded to.
(Step F5)
Point data PH2, showing the arrival point of the interpolation calculation, is set in correspondence with point number P (that is, in this case, the data of point P1 of positional data 8 step shown in FIG. 2(a)), and step F6 is proceeded to.
(Step F6)
An interpolation number of the path data from a position in correspondence with point data PH1 to a position in correspondence with PH2 (in this case, taught point P1) is calculated, and step F7 is proceeded to.
(Step F7)
A decision is made as to whether interpolation point number S has reached interpolation number ST; in the case where it has reached this number, step F8 is proceeded to, while in the case where it has not reached this number, step F16 is proceeded to.
(Step F8)
A decision is made as to whether point number P is "1" or not; if P=1, step F9 is proceeded to, while if this is not so step F10 is proceeded to.
(Step F9)
Movement flag MF is set to "0", robot body 2 is placed on stand by, and step F10 is proceeded to.
(Step F10)
Point data PH1 of the beginning point of interpolation is set to positional data 8, which is shown by point number P, and step F11 is proceeded to.
(Step F11)
The value of point number P increases by 1, interpolation point number S is set to "0", and step F12 is proceeded to.
(Step F12)
A decision is made as to whether the value of point number P exceeds point number N (the number of taught points P1, P2, . . . ); in the case where P exceeds N, step F13 is proceeded to, while in the case where P does not exceed N, step F14 is proceeded to.
(Step F13)
Point number P is set to "1", and step F14 is proceeded to.
(Step F14)
Point data PH2, which shows the arrival point of the interpolation calculation, is set to positional data 8, which is in correspondence with point number P, and step F15 is proceeded to.
(Step F15)
The path data from point PH1 to point PH2 and the interpolation numbers ST step are calculated and step F16 is proceeded to.
(Step F16)

A control signal corresponding to the positional data shown by interpolation point number S is outputted to robot body 2, and step F17 is proceeded to.

(Step F17)

The operational data of spray gun 1 shown by point number SP (that is, the data shown in FIG. 2(b)) are read out, and step F18 is proceeded to.

(Step F18)

A determination is made as to whether the time data 10 corresponding to point number SP and the present regeneration moment (the time since the starting from taught point P1) are equal; if they are equal, step F19 is proceeded to, while if they are not, step F23 is proceeded to.

(Step F19)

A control signal is outputted in response to time data 11, which correspond to point number SP, the operational state of spray gun 1 is switched, and step F20 is proceeded to.

(Step F20)

The value of point number SP is increased by one, and step F21 is proceeded to.

(Step F21)

A determination is made as to whether the value of point number SP exceeds the value of point number M (the number of taught points S1, S2, ... ); if SP exceeds M, step F22 is proceeded to, while if SP does not exceed M, step F23 is proceeded to.

(Step F22)

The value of point number SP returns to "1", and step F23 is proceeded to.

(Step F23)

The value of interpolation point number S is increased by one, and processing is ended.

Here, steps F3–F6 are path calculation processing from the start time to taught point P1, steps F10–F15 are path calculation processing between taught points, steps F1, F2, F7–F9, F16, and F23 are control processing of robot body 2, and steps F17–F21 are control processing of spray gun 1.

By means of the processing of steps F1–F23 as explained above, first, when started, the path from the present position of robot body 2 to taught point P1 is calculated, robot body 2 is moved to taught polar P1 and placed in a standby state. After this, when the start of regeneration is directed and movement flag MF becomes "1", the interpolation points along path 4, which is made up of taught points determined by positional data 8, are successively calculated, a control signal corresponding to the positional data of these interpolation points is outputted at each sampling cycle, and robot body 2 moves smoothly along path 4.

In addition, at this time, at every sampling cycle, a determination is made as to whether the positional data of the interpolation points which are outputted as a control signal are in agreement with the time data 10 used as the positional data for the switching of the operation; when they are in agreement, a control signal is outputted which is in correspondence with the operational data 11 of spray gun with respect to time data 10. By means of this, the operational state of spray gun 1 is switched in accordance with the taught operational data 11 at points S1, S2, S3, and S4 along path 4 of robot body 2.

Here, in order to simplify the explanation, the path calculation (interpolation calculation) was included in the control processing of robot body 2 and spray gun 1 shown in FIG. 3; however, it is acceptable to perform this with a different routine.

According to the present preferred embodiment, the number of data 10 and 11 to be set as data for the switching of the operational state of a work tool improves only by an amount corresponding to the number of times the operational state of spray gun 1 (work tool) is switched. Furthermore, the number of positional data 8 and 9 of robot body 2 improves only by an amount corresponding to the number of times path 4 changes; as shown in FIG. 6, in comparison to the background art, in which these data are set for all taught points, comprising both points at which the operational state of the work tool is switched and the points at which the path changes, the memory area occupied by these data can be considerably reduced.

Furthermore, the number of data set in the teaching operation are reduced, and there is no need to manually adjust the posture of robot body 2 while teaching the movement of spray gun 1 (as the movement data have already been created), so that along path 4 the on/off position of the spray alone can be considered. By means of this the teaching operation becomes easy, and teaching can be accomplished in a short time. Furthermore, the quality of the teaching program is increased.

In addition, at each sampling cycle for the control of robot body 2, the data for the control of spray gun 1 are checked and its operational state switched, so that it is possible to determine the operation of robot body 2 in the same manner and finely switch the operation of spray gun 1.

The above preferred embodiment incorporates the PTP teaching system; however, it Is acceptable to adapt the present preferred embodiment to a CP teaching system robot. For example, it is acceptable to store the positional data 12 of robot body 2 at each sampling cycle, as shown in FIG. 4(a), and set time data 13 and operational data 14 as the operational data of spray gun 1. The same effects are obtained in this case as in the case of the PTP teaching system mentioned above.

That is to say, in the conventional CP teaching system, as shown in FIG. 5, the positional data 15 of robot body 2 and the operational data 16 of the work tool are all stored at previously determined sampling cycles. In addition, the numbers of these data become the values excluded at the sampling cycle of the regeneration time (work time) of the teaching program. For example, when the regeneration time is set at 60 sec, and the sampling cycle at 20 msec, the number of the data becomes 3000, and if, for example, the necessary amount of memory for one operational datum 16 is set at 2 bytes, 6000 bytes of memory will be necessary for operational data 16 alone. However, according to the present invention, as shown in FIGS. 4(a) and 4(b), though the amount of memory necessary for the posture data 12 of robot body 2 does not change from conventional methods, if for example the amount of memory necessary for one operational datum of spray gun 1 is set at 4 bytes and the number of times the spray is turned on/off is set at 20, 80 bytes of memory will be sufficient for the necessary amount of memory for the operational data of spray gun 1.

Furthermore, in the teaching operation as well, as with the PTP teaching system, the operation of the robot body is taught, and after this the robot body is operated and the teaching of operational data of spray gun 1 is carried out at positions where the spray is to be turned on and off. Here as well, it is acceptable to carry out teaching during continuous operation, or to stop at positions where the spray is to be turned on and off, and to conduct teaching at accurate positions.

Furthermore, the above preferred embodiment embodies one spray gun attached as a work tool, but a plurality of work tools are possible, and furthermore, there is no limitation as regards the spray gun, but rather a welding torch or hand or the like are possible.

What is claimed is:

1. A method for controlling the operation of an industrial robot, said industrial robot comprising:
   a work tool; and
   an operating means for moving and positioning said work tool and for switching the operational state of said work tool, said method comprising the steps of:
   (a) obtaining first data for determining a path of the work tool, said first data comprising time data and position data;
   (b) obtaining second data for determining said operational state of said work tool during the movement of said work tool in said path, said second data consisting of time data;
   (c) inputting said first data and said second data into said operating means;
   (d) moving said work tool along said path based on said first data while controlling the operational state of said work tool based on said second data.

2. A method of controlling the operation of an industrial robot according to claim 1 wherein said operating means further comprises:
   a timing means for generating a sample time base; and
   at least one memory means;
   wherein step (d) further comprises the steps of:
   (e) counting a number of elapsed sampling cycles by said timing means;
   (f) storing said second data in one of said at least one memory means;
   (g) comparing said number of sampling cycles elapsed with said second data at each cycle of said time base;
   (h) operating said work tool so as to activate said work tool when said number of elapsed sampling cycles corresponds to said second data and third data indicating the activation of said work tool; and
   (i) operating said work tool so as to deactivate said work tool when said number of elapsed sampling cycles corresponds to said second and third data.

3. A method of controlling an operation of an industrial robot according to claim 1, wherein said operating means is a PTP (point-to-point) teaching playback type robot.

4. A method of controlling an operation of an industrial robot according to claim 1, wherein said operating means is a CP (continuous path) teaching playback type robot.

5. A method of controlling an operation of an industrial robot according to claim 1, wherein said operating means includes a six-axis articulated robot body.

6. A method of controlling an operation of an industrial robot according to claim 1, wherein said work tool is a spray gun, and said third data includes on/off data of the spray.

7. A method of controlling an operation of an industrial robot according to claim 1, wherein, said operating means has a function in a teaching mode which permits the tracing of a path based on said first data.

8. A method of controlling an operation of an industrial robot according to claim 1, wherein, said work tool is a welding torch, and said second data includes on/off data of the welding torch.

9. A method for controlling the operation of an industrial robot according to claim 1, wherein said second data are expressed as time data at which the operational state of the work tool is switched.

10. A method for controlling the operation of an industrial robot according to claim 6, wherein said spray gun sprays a paint.

11. A method for controlling the operation of an industrial robot according to claim 6, wherein said spray gun sprays a sealing material.

* * * * *